Patented Feb. 14, 1939

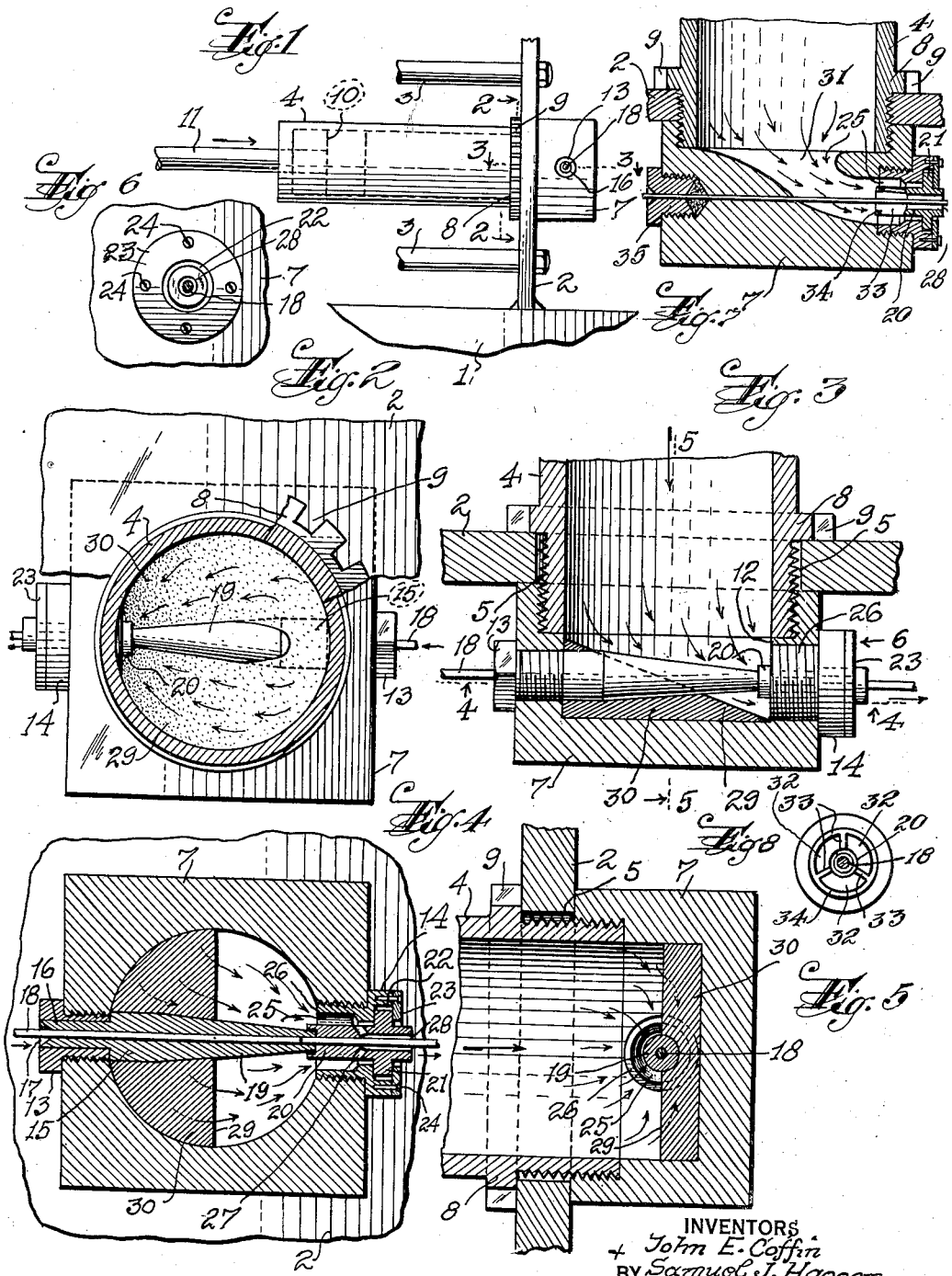

2,147,281

UNITED STATES PATENT OFFICE 2,147,281

MEANS FOR COVERING ELONGATED ARTICLES

John Edmund Coffin, Maplewood, and Samuel James Haggan, North Arlington, N. J., assignors to Electric Arc Cutting & Welding Company, Newark, N. J.

Application August 4, 1937, Serial No. 157,320

8 Claims. (Cl. 18—13)

This invention relates to means for covering elongated articles, such as electrical cables, conductors or the like, and is especially useful in covering electrodes used in metallic arc welding.

In order to show the usefulness of the invention, we have chosen, by way of illustration but not of limitation, to describe the application of the invention to covering welding electrodes wherein it has marked advantages over prior methods and apparatus.

Welding electrodes may be covered in several ways, such as by brushing, dipping or extruding the covering over the electrodes, and it is to this last method of covering them that our improvements are directed.

In the past it has been the practice to extrude the flux coating over the electrode by the use of dies in which the finishing die is held in a rigid position in a holder suitably mounted in the extruding machine. While it has been the practice to mount the finishing die in its holder in an adjustable manner, in an endeavor to centralize, as nearly as possible, the exit opening from the die symmetrically around the electrode, the fact remains that the electrodes are not always straight, and since there must be clearance around the electrode for the flux coating to be extruded thereover, a crooked electrode will, as it is passed through the die block, move to one side of the exit opening in the finishing die and thereby cause the flux covering to be extremely thin in spots; or the electrodes, in some cases, may be substantially bare at certain spots. Then, when the electrode is used in welding, the arc will break through these thin or bare spots and cause trouble in the welding operations.

After much study and many tests, we have overcome this difficulty by mounting the finishing die so that it will be floating or self-aligning in its holder, and to further provide an internal construction of the die which will produce a covered electrode in which the covering of flux material is of uniform thickness throughout its length on the electrode.

Our invention will be understood by reference to the annexed drawing, in which:

Figure 1 is a fragmentary view, in elevation, of a portion of a flux-covering machine, showing the flux cylinder and die block in position for passing an electrode therethrough.

Figure 2 is a view on the line 2—2 of Figure 1.

Figure 3 is a view on the line 3—3 of Figure 1, the view being turned 90° from the position of Figure 1.

Figure 4 is a view on the line 4—4 of Figure 3.

Figure 5 is a view on the line 5—5 of Figure 3.

Figure 6 is an end view looking in the direction of the arrow 6 of Figure 3.

Figure 7 is a view similar to Figure 3, but showing a modified form of construction.

Figure 8 is an end view of the finishing die per se shown in Figure 7, looking from left to right on a somewhat enlarged scale.

In the various views, wherein like numbers refer to corresponding parts, 1 is a pedestal to which is fastened, as by welding, a support member 2 having brace rods 3 connected to another part of the extruding machine.

To the support member 2 is attached a cylinder 4 for receiving the electrode or article-covering material. The cylinder 4 is threaded at 5, and on the thread 5 is screwed a die block 7 which acts with the annular flange 8 on the cylinder 4 to clamp the parts securely to the support member 2. As shown in Figures 1 and 2, the flange 8 is provided with a plurality of notches 9 for receiving a suitable tool for screwing the cylinder 4 into the die block 7. The cylinder 4 is provided with a piston 10 connected to a piston rod 11 for forcing the flux or covering material out of the cylinder into the die block, as explained.

The die block 7 has a bore 12 which, when the parts are together as shown in Figure 3, is in alignment with the bore in the cylinder 4. Mounted in tandem, transversely across the bore 12, are a pair of die holders 13 and 14. The die holder 13 carries a guiding die 15 having a reduced shank 16 which closely fits the die holder 13. Preferably, the outer end of the shank 16 is counter-sunk at 17 to provide a guiding entrance to the end of the electrode 18. The die 15 preferably has a tapered surface 19 extending toward and closely adjacent the end of the die holder 14 which carries a finishing die 20 having a counterbored recess (see Figure 4) to receive the end of the tapered portion 19 of the die 15. The finishing die 20 has a flange 21 positioned in an annular seat 22 in the holder 14. As will be seen by reference to Figure 4, the flange 21 is considerably smaller in diameter than the annular seat 22 provided for it in the holder 14, so that if the electrode 18 has a crook in it, when it enters the end of the die 20 adjacent the tapered portion 19 of the die 15, this will cause the die 20 to move in its seat in any radial direction. The die 20 is held in place by an annular plate 23 held to the holder in any satisfactory manner as by screws 24, whereby different dies 20 may be used in the holder 14.

As shown in Figures 3 and 4, when the piston 10 is moved to force the covering material out of the cylinder 4, this is moved in the direction of the several arrows into an annular space 25 between the skirt 26 of the holder and the die 20 which has a plurality of holes 27 passing through the wall of the die 20 at the base of an exit opening 28 in the die 20. The diameter of the exit opening or hole 28 is made to fix the diameter of the covering applied to the electrode 18. Preferably, the holes 27 are slanted backwardly as indicated in Figure 4, so that the flux or covering is readily extruded through the space 26 and holes 27, into the hole 28 of the die 20.

To assist the flux or covering in its passage through the finishing die 20, we have provided an inclined surface 29 in the bottom of the die block 7. In practice, in constructing the die block 7, we can readily obtain the formation of the inclined surface 29 by tilting the die block to the desired angle and filling in the bottom or end portion with molten material, such as lead. Besides acting to guide the covering material into the space 25, the material 30, forming the inclined surface 29, fills in the end of the bore 12 in the die block and prevents the covering material from getting packed and hardened in lumps in this end of the die, which lumps might subsequently be forced out of place in leaving the finishing die 20, thereby causing trouble.

It will be understood that the clearance between the electrode 16 and the hole through the guiding die 15 is very small, being close to .005", the same being true, also, of the clearance in the end of the die 20 which is adjacent the tapered end 19 of the die 15.

In Figure 7, the die block 7 is made with a reduced passageway 31 leading from the cylinder 4 to the annular space 25 which leads to the exit opening 28. The finishing die in this case has openings 32 very much larger than the openings 27 shown in the die in Figure 4. In fact, these openings cover most of the arcuate length of the inner end of the finishing die 20; or, as shown in Figure 8, the openings 32 are merely separated by flanges or prongs 33 which may, in some cases, have an outboard support formed by the ring 34. By the use of this construction, the covering material may have a clear flow around the article being covered. This is especially necessary where the covering compound is of a highly sticky nature, such as for hose rubber, or somewhat similar compounds used in covering electrical cables and conductors. A metallic covering, such as lead, also requires a free flow around the article being covered.

It will be noted that in this form of construction, the guiding die 15 is entirely eliminated and only a stuffing gland 35 is necessary, as the article to be covered has its support over a considerable distance in the die block 7. An advantage of the construction shown in Figure 7 is that the chamber in the die block can be materially reduced in size and none of the covering material will be trapped therein to cause future trouble. Furthermore, the pressure applied to the covering is more uniformly distributed around the openings into the finishing die.

In general, it may be said that the maximum openings, such as 27 or 32, are desirable as this will allow passage of the covering material through the finishing die with the least separation thereof. Furthermore, it may be said that the size and number of the apertures 27 and 32 can be arranged to determine the pressure best adapted for the purpose. Stated in another way, for a given covering or coating there is a "best" pressure to use for the size of the openings into the die and the thickness of the coating to be applied.

Besides absolutely eliminating the trouble referred to in the early part of this specification with reference to covering welding electrodes, the self-centering or floating finishing die 20 provides a construction which eliminates a large amount of time which it was heretofore necessary to spend in an endeavor to centralize the old style of finishing die.

It is to be understood that new dies must be put in when different sizes of articles are to be covered, and since with our construction the dies may be quickly changed, the manufacturing process is thus speeded up, and at the same time a far better product is produced.

We claim:

1. Means for covering elongated articles including a flux cylinder, a die block having a bore therein and fastened to the cylinder so the bore is in alignment with the bore of the cylinder, a pair of dies carried by said block in tandem alignment transversely across the bore in the block, a holder for at least one of said dies, means for mounting one of said dies in said holder so it can, under influence of irregularities of the article being covered, automatically shift therein in any radial direction, said die having a hole at its inner end to engage the article to be covered, and being enlarged at the outer end of the die into a sizing hole, the die having holes through its wall at the beginning of the enlarged hole and leading to the block bore, and means in the flux cylinder for forcing flux therein into the bore of the die and through the holes in said one die around the article.

2. Means for covering elongated articles including a flux cylinder, a die block having a bore therein and fastened to the cylinder so the bore is in alignment with the bore of the cylinder, a guiding die mounted in one side of the block and extending into the bore thereof, a holder fastened to the block on the opposite side from the guiding die, a finishing die carried by said holder in alignment with the guiding die and in operative relation to the bore block, the finishing die being so carried by the holder that the die floats therein, and having a counterbore at its inner end to receive the inner end of the guiding die, said finishing die also having a small hole to receive the bare article to be covered and merging into an enlarged hole at its exit end with generally transverse holes in its wall at the base of said enlarged hole, said transverse holes having communication with the block bore, and a piston in the flux cylinder for forcing flux therein into the bore of the die and through the holes in said one die around the article.

3. Means for covering elongated articles including a flux cylinder, a die block having a bore therein and fastened to the cylinder so the bore is in alignment with the bore of the cylinder, a guiding die mounted in one side of the block and extending into the bore thereof, a holder on the opposite side of the block, a finishing die mounted in the holder in alignment with the guiding die and in operative relation to the block bore, the finishing die being carried in the holder so the said die floats therein, said holder having a skirt spaced away from the body portion of the die which has a small hole at its inner end to receive the bare article to be covered and leading into a hole at its exit end large enough to determine the thickness of the coating over the article coming through the die, said die having holes through its side wall at the base of the said large hole and leading into the space between the skirt and body of the die, and a piston in the flux cylinder for forcing flux therein into the bore of the die and through the holes in said one die around the article.

4. Means for covering elongated articles as set forth in claim 1, further characterized in that the two dies are carried in the block by separate holders, the holder for the exit or finishing die having an annular seat and a skirt spaced from the body of the die, said die having a flange to engage the seat in the holder, the diameter of the flange being considerably smaller than the diameter of the seat for the purpose described, means for longitudinally holding the flange in its seat, said holes through the wall in the die, preferably slanting backwards, through its wall at the base of the said enlarged hole into the space defined by the skirt.

5. Means for covering an elongated article with a relatively thick covering, including a cylinder for containing the covering material, a die block having a bore therein and fastened to the cylinder so the bore is in alignment with the bore of the cylinder, a guiding die and a finishing die mounted in the block in tandem relation transversely across the block bore, the finishing die being so mounted that it can, due to irregularities in the article being covered, automatically shift in any radial direction, said die having a hole at its exit end of a diameter which will determine the thickness of the covering over the article and a small hole for first receiving the bare article to be covered, and holes through the side wall of the die at the base of the thickness-determining hole and communicating with the block bore, and means for forcing the covering material from the cylinder into the block bore and finishing die.

6. For covering an elongated article, a die block having a bore into which the covering material is to be forced, a pair of holders carried by the block, a guiding die and a finishing die each held by one of the holders in the block in tandem relation across the bore, the finishing die being so mounted in its holder that it can, due to irregularities in the article being covered, automatically shift in any radial direction, and further having an exit hole of a diameter which will determine the thickness of the covering, and holes through its side wall at the base of the exit hole and communicating with the block bore.

7. For covering an elongated article, a die block, a finishing die carried by said block so that it can, due to irregularities in the article being covered, automatically shift in any radial direction, the die having an exit hole of a diameter which will determine the thickness of the covering, means for supporting the die block, means for passing said article through the die, and means for forcing a covering material through the die over said article.

8. For covering an elongated article, a die block with means for supporting the same, a die holder carried by the block, a finishing die carried by the holder that it floats therein and can change its position in accordance with irregularities in the article being covered as said article passes through the die, said die so having a bore at one end to determine the thickness of the covering around the article and at the other end a plurality of maximum-size, arcuately positioned openings through the side wall into said bore, the die block being provided with a reduced passageway leading from said arcuate openings in the die to a supply cylinder containing the covering material to be forced through the die, means for passing said article through the die and means for forcing a covering material through the die around said article.

JOHN EDMUND COFFIN.
SAMUEL JAMES HAGGAN.